(12) United States Patent
Kube

(10) Patent No.: US 6,191,212 B1
(45) Date of Patent: Feb. 20, 2001

(54) MOISTURE-CURING HOTMELT ADHESIVES

(75) Inventor: Olaf Kube, Duesseldorf (DE)

(73) Assignee: Henkel Kommanditgesellschaft auf Aktien, Duesseldorf (DE)

( * ) Notice: Under 35 U.S.C. 154(b), the term of this patent shall be extended for 0 days.

(21) Appl. No.: 08/408,087

(22) Filed: Mar. 21, 1995

Related U.S. Application Data

(62) Continuation of application No. 08/310,008, filed on Sep. 21, 1994, now abandoned, which is a continuation of application No. 08/039,109, filed as application No. PCT/EP91/01890 on Oct. 4, 1991.

(30) Foreign Application Priority Data

Oct. 11, 1990 (DE) .................................. P4032308
Oct. 4, 1991 (DE) .................................... PCT/EP91/01890

(51) Int. Cl.⁷ ................ C08J 3/00; C08K 3/20; C08L 75/00; C08G 18/00
(52) U.S. Cl. ................ 524/590; 524/589; 528/73
(58) Field of Search ............... 528/73; 524/589, 524/590

(56) References Cited

U.S. PATENT DOCUMENTS 4,801,675 * 1/1989 Pedain et al. ................. 528/73

FOREIGN PATENT DOCUMENTS

| 0053359 | 6/1982 | (EP) . |
| 0129808 | 1/1985 | (EP) . |
| 0150444 | 8/1985 | (EP) . |

OTHER PUBLICATIONS

Dr. rer.nat.Hans Neff, "Grundlagen und Anwendung der Röntgen–Feinstruktur–Analyse" p. 320 (1959).

* cited by examiner

*Primary Examiner*—Patrick D. Niland
(74) *Attorney, Agent, or Firm*—Wayne C. Jaeschke; Stephen D. Harper

(57) ABSTRACT

Disclosed are moisture-curing hotmelt adhesives containing polyurethane prepolymers with an isocyanate group content of 0.16–0.84 moles of isocyanate groups per kilogram of prepolymer, the prepolymers being obtained by reacting crystalline polyester polyols having a mean molecular weight of 2,000–10,000, optionally mixed with liquid and/or amorphous polyester and/or polyether polyols having an isocyanate functionality greater than one, the adhesives also containing diisocyanates trimerized to give isocyanurates. Adhesives of this kind have improved processing characteristics and are easier to use.

20 Claims, No Drawings

MOISTURE-CURING HOTMELT ADHESIVES

This application is a continuation of application Ser. No. 08/310,008 filed on Sep. 21, 1994 now abandoned which is a continuation of Ser. No. 08/039,109 filed on Apr. 12, 1993 now abandoned, which is a 371 of PCT/EP91/01890 filed Oct. 4, 1991.

SUMMARY OF THE INVENTION

This invention relates to a moisture-curing hotmelt adhesive containing:
a) polyurethane prepolymers, with a content of NCO groups of 0.16 to 0.84 moles of NCO groups per kg of prepolymer, obtainable by reaction of crystalline polyester polyols having a number average molecular weight in the range from 2000 to 10,000, optionally in admixture with liquid and/or amorphous polyester polyols and/or polyether polyols having a number average molecular weight in the range from 500 to 10,000, with isocyanates having a functionality of more than 1 and
b) diisocyanates trimerized to isocyanurates.

STATEMENT OF RELATED ART

Moisture-curing or moisture-crosslinking hotmelt adhesives based on polyurethanes are normally prepared in one step from polyols and isocyanates having a functionality of more than 1, i.e. containing more than one NCO group per isocyanate molecule, with an excess of NCO groups based on free OH groups in the polyols. The molecular weight of the prepolymers obtained is dependent upon the functionality of the polyols and isocyanates used, an increase in functionality resulting in an increase in molecular weight. Although a relatively high functionality of the polyols and isocyanates leads to relatively high tensile shear strengths of the bonds established with the moisture-curing hotmelt adhesives, the viscosity of the prepolymers increases at the same time exponentially with their molecular weight. Accordingly, there are narrow limits to improvements in tensile shear strength by the use of polyols and isocyanates of relatively high functionality.

Another disadvantage of the moisture-curing hotmelt adhesives known from the prior art with an excess of the generally liquid isocyanates lies in the fact that the isocyanates have a substantial vapor pressure at the temperatures in the region of 130° C. at which moisture-curing hotmelt adhesives are normally processed, so that special protective measures have to be taken during processing.

DETAILED DESCRIPTION OF THE INVENTION

Object of the Invention

The problem addressed by the present invention was to improve the processing and performance properties of typical moisture-curing hotmelt adhesives and, more particularly, to increase the mechanical strength of the bond without any adverse effect on the viscosity of the hotmelt adhesive, its open time or its initial strength.

DESCRIPTION OF PREFERRED EMBODIMENTS

The isocyanurates present in the moisture-curing hotmelt adhesives according to the invention have a such a low vapor pressure, even at typical hotmelt processing temperatures, that the above-mentioned protective measures during processing are no longer necessary or do not to be taken to the same extent as before.

The moisture-curing hotmelt adhesives according to the invention may contain typical additives familiar to one skilled in the art. Typical examples of such additives are fillers, tackifiers and plasticizers. They may also contain typical catalysts which accelerate curing of the hotmelt adhesives, for example metal catalysts, such as dibutyl tin dilaurate, amine catalysts, such as dimorpholine diethyl ether and the like.

Crystalline polyester polyols in the context of the invention are those which are solid and at least partly crystallized at room temperature, for example solid partly crystalline polyester polyols having a degree of crystallization of more than 30%, as measured with X-rays in accordance with Neff, Grundlagen und Anwendung der Röntgenfeinstruktur [Title in English: Fundamentals and Applications of X-ray Fine Structure], (Verlag R. Oldenbourg, München, 1959), page 320. Typical examples are the commercially available DYNACOLL® types RP 320, 340, 350 and 360.

Liquid polyester polyols are, for example, those which are liquid at 20° C. and have a glass temperature below 0° C. Typical examples are the DYNACOLL® types 210, 220, 230 and 250.

Amorphous polyester polyols are solid at ambient temperature and have a glass temperature above 0° C., for example the DYNACOLL® types RP 110, 130 and 140.

In one preferred embodiment of the invention, the polyurethane prepolymers have a content of NCO groups of 0.22 to 0.72 moles of NCO groups per kg of prepolymer.

Polyester polyols or polyether polyols and isocyanates are normally reacted in quantities corresponding to an NCO:OH ratio of 3.5:1 to 1.4:1 and preferably 3:1 to 1.7:1.

In another advantageous embodiment of the invention, the crystalline polyester polyols, liquid and/or amorphous polyester polyols and polyether polyols have an OH functionality of 1.8 to 2.7 and, more particularly, 2. The OH functionality is the number average of free OH groups per polyester polyol or polyether polyol molecule.

In another advantageous embodiment of the invention, the isocyanates have an NCO functionality of 1.8 to 2.7 and, more particularly, 2. Isocyanates such as these are commercially available compounds.

In another advantageous embodiment of the invention, the number average molecular weights of the crystalline polyester polyols are in the range from 3000 to 7000, the number average molecular weights of the liquid and/or amorphous polyester polyols are in the range from 1500 to 5000 and the number average molecular weights of the polyether polyols are in the range from 1500 to 5000.

In another advantageous embodiment of the invention, the crystalline polyester polyols are condensation products of glycols selected from the group consisting of ethylene glycol, butylene glycol, hexamethylene glycol and decamethylene glycol and dicarboxylic acids selected from the group consisting of oxalic acid, suberic acid, adipic acid, sebacic acid, phthalic acid, isophthalic acid, terephthalic acid and hexahydrophthalic acid (cis and trans forms).

Crystalline polyester polyols in the form of condensation products of hexamethylene glycol or decamethylene glycol and adipic acid are particularly preferred.

In another advantageous embodiment of the invention, the liquid and/or amorphous polyester polyols are condensation products of polyols from the group consisting of ethylene glycol; polyethylene glycol, for example diethylene glycol, triethylene glycol, tetraethylene glycol and the like; propylene glycol; polypropylene glycol, for example dipropylene glycol, tripropylene glycol and the like; butylene glycol; neopentyl glycol; hexamethylene glycol; decamethylene glycol; bisphenol A; reaction products of bisphenol A with ethylene oxide and/or propylene oxide; glycerol and pentaerythritol with dicarboxylic acids from the group consisting of adipic acid, maleic acid, phthalic acid and isophthalic acid. Liquid and/or amorphous polyester polyols obtainable by condensation of mixtures of the above-mentioned polyols and dicarboxylic acids are also suitable. Liquid and/or amorphous polyester polyols, which are condensation products of glycols from the group consisting of ethylene glycol, diethylene glycol and neopentyl glycol with the dicarboxylic acids mentioned, are particularly preferred.

In another advantageous embodiment of the invention, the polyether polyols are selected from the group consisting of polyethylene glycol, polypropylene glycol and polytetramethylene glycol, including copolymers thereof. Physical mixtures of the above-mentioned glycols may also be used.

In another advantageous embodiment of the invention, the isocyanates having a functionality of more than 1 are selected from the group consisting of diphenylmethane-4,4'-diisocyanate, diphenylmethane-2,4'-diisocyanate, hydrogenation products of the above-mentioned diisocyanates, tolylene-2,4-diisocyanate, tolylene-2,6-diisocyanate, hexamethylene diisocyanate, isophorone diisocyanate and naphthylene-1,5-diisocyanate, including technical mixtures thereof.

In another advantageous embodiment of the invention, the diisocyanates trimerized to isocyanurates are derived from diisocyanates selected from the group consisting of diphenylmethane-4,4'-diisocyanate, diphenylmethane-2,4'-diisocyanate, hydrogenation products of the above-mentioned diisocyanates, tolylene-2,4-diisocyanate, tolylene-2,6-diisocyanate, hexamethylene diisocyanate, isophorone diisocyanate and naphthylene-1,5-diisocyanate, including technical mixtures thereof. Trimerized isophorone diisocyanate (IPDI isocyanurate) is particularly preferred.

In another advantageous embodiment of the invention, the polyurethane prepolymers are obtainable by reaction of:
  94 to 40% by weight of crystalline polyester polyols,
  0 to 40% by weight of liquid and/or amorphous polyester polyols or polyether polyols and
  6 to 20% by weight of isocyanates having a functionality of more than 1, the sum of the percentages lying within these ranges being 100% by weight.
Polyurethane prepolymers obtainable by reaction of:
  90 to 50% by weight of crystalline polyester polyols,
  4 to 30% by weight of liquid and/or amorphous polyester polyols and
  6 to 20% by weight isocyanates having a functionality of more than 1, the sum of the percentages lying within these ranges being 100% by weight, is are particularly preferred.

A particularly preferred moisture-curing hotmelt adhesive according to the present invention has the following composition:
  80 to 99.8% by weight of polyurethane prepolymers and
  20 to 0.2% by weight of diisocyanates trimerized to isocyanurates, the additives mentioned above optionally being incorporated in the usual quantities.

The moisture-curing hotmelt adhesives according to the invention may be obtained by initially introducing the crystalline or liquid and/or amorphous polyester polyols and, optionally, the polyether polyols and, after the careful removal of water at elevated temperatures, reacting them in vacuo with the isocyanates having a functionality of more than 1 in the absence of moisture and optionally in an inert gas atmosphere until the required NCO content of the prepolymer has been reached. The diisocyanates trimerized to isocyanurates are incorporated in the prepolymers thus obtained at elevated temperature in the desired quantity ratios, optionally together with the usual additives.

The present invention also relates to the use of diisocyanates trimerized to isocyanurates in the production of moisture-curing hotmelt adhesives.

The invention will be illustrated in more detail by the following Example of a preferred embodiment.

EXAMPLE

A basic formulation for a moisture-curing polyurethane hotmelt adhesive was initially prepared from the following components:

57 parts by weight of hexamethylene glycol adipate (crystalline polyester glycol; commercially available; hydroxyl value 26.7; equivalent molecular weight 2100 g/mole; OH functionality 2);

29 parts by weight of commercially available ethylene glycol/diethylene glycol adipate (hydroxyl value 42; equivalent molecular weight 1333 g/mole; OH functionality 2);

14 parts by weight of diphenylmethane-4,4'-diisocyanate; commercially available quality (NCO content 33.6%).

To prepare the basic formulation, the polyester glycols mentioned above were initially put into liquid form and freed from water in an oil pump vacuum at 100° C. After addition of the diphenyl methane-4,4'-diisocyanate, the mixture was left to react for about 30 to 60 minutes at 120° C. in an oil pump vacuum. The prepolymer obtained had an NCO content of about 2.5% by weight and an equivalent molecular weight, based on the NCO group, of 1680 g.

Various moisture-curing hotmelt adhesives of which the composition is shown in Table 1 were prepared from the basic formulation thus obtained with addition of dibutyl tin dilaurate and isophorone diisocyanate isocyanurate or (for comparison purposes) a commercially available liquid diphenylmethane-4,4'-diisocyanate (NCO content 30–32%; equivalent molecular weight 140 to 131 g/mole; Brookfield viscosity at 23° C. of 200±50 mPa.s; average functionality of 2.3; Trade name DESMODUR® VKS).

Formulation No. 1 contains only the basic formulation apart from the dibutyl tin dilaurate and is intended for comparison purposes. The same applies to formulations Nos. 6 and 9 which contain commercially available diphenylmethane-4,4'-diisocyanate. Formulations Nos. 2 to 5 contain varying quantities of isophorone diisocyanate isocyanurate and are moisture-curing hotmelt adhesives according to the present invention.

TABLE 1

| | Weighed quantities in parts by weight | | | |
|---|---|---|---|---|
| No. | Basic formulation | IPDI-I | VKS | DBTDL |
| 1 | 100.00 | — | — | 0.015 |
| 2 | 98.87 | 1.13 | — | 0.014 |
| 3 | 97.24 | 2.76 | — | 0.014 |

TABLE 1-continued

Weighed quantities in parts by weight

| No. | Basic formulation | IPDI-I | VKS | DBTDL |
|---|---|---|---|---|
| 4 | 94.74 | 5.26 | — | 0.015 |
| 5 | 89.94 | 10.06 | — | 0.013 |
| 6 | 98.71 | — | 1.29 | 0.015 |
| 7 | 97.18 | — | 2.82 | 0.015 |
| 8 | 94.73 | — | 5.27 | 0.016 |
| 9 | 89.96 | — | 10.04 | 0.016 |

IPDI-I: IPDI isocyanurate
VKS: DESMODUR ® VKS
DBTDL: dibutyl tin dilaurate

Formulations Nos. 1 to 9 were tested for their viscosity behavior, their tensile shear strengths on test specimens of beechwood and their open time. The results are set out in Table 2. The viscosity measurements were carried out with a Physica LC 10 viscosimeter (insert Z4).

As can be seen from the test results in Table 2, the viscosity of the moisture-curing hotmelt adhesive according to the invention remains the same where IPDI isocyanurate is added. The same applies to the open time and initial strength by comparison with a hotmelt adhesive corresponding to the basic formulation with dibutyl tin dilaurate. By contrast, the strength of the cured product increases in dependence upon the quantity of IPDI isocyanurate added. Where the system tested for comparison purposes—containing the basic polymer and the liquid diisocyanate VKS instead of IPDI isocyanurate—is used, an increase in the open time has to be accepted.

TABLE 2

| | Viscosity in P · s at 130° C. | | | Tensile shear strengths in N/mm² | | | Open time |
|---|---|---|---|---|---|---|---|
| | Shear rate in l/s: | | | Uncured | Cured | | |
| No. | 64.6 | 129.1 | 258.2 | 20° C. | 20° C. | 90° C. | (%) |
| 1 | 6.91 | 6.8 | 6.61 | 1.02 ± 0.07 | 6.31 ± 0.18 | 1.58 ± 0.26 | 100 |
| 2 | 7.35 | 7.20 | 6.87 | 1.09 ± 0.11 | 6.71 ± 0.26 | 1.60 ± 0.17 | 100 |
| 3 | 7.05 | 6.95 | 6.72 | 0.99 ± 0.09 | 7.31 ± 0.52 | 1.72 ± 0.19 | 100 |
| 4 | 6.84 | 6.65 | 6.24 | 1.11 ± 0.08 | 8.29 ± 0.28 | 1.63 ± 0.19 | 100 |
| 5 | 5.84 | 5.65 | 5.46 | 1.06 ± 0.05 | 8.19 ± 0.90 | 2.43 ± 0.41 | 105 |
| 6 | 6.85 | 6.75 | 6.60 | 1.05 ± 0.05 | 7.56 ± 0.14 | 1.94 ± 0.23 | 100 |
| 7 | 6.45 | 6.24 | 6.09 | 1.03 ± 0.10 | 6.56 ± 0.59 | 1.47 ± 0.21 | 130 |
| 8 | 5.94 | 5.84 | 5.72 | 1.07 ± 0.06 | 7.57 ± 0.90 | 2.24 ± 0.50 | 140 |
| 9 | 4.73 | 4.83 | 4.76 | 0.97 ± 0.02 | 8.96 ± 1.16 | 2.26 ± 0.49 | 190 |

Tensile shear strengths: 100 mm × 50 mm × 3.8 mm test specimens of beechwood 20 mm overlap
Test speed: 50 mm/min.
Tensile shear strength of the uncured product: determined 20 minutes at most after production
Open time: time after which a 0.5 mm thick film drawn at 130°0 C. is tack-free.

What is claimed is:

1. A moisture-curing hotmelt adhesive containing:
   a) polyurethane prepolymers with a content of NCO groups of 0.16 to 0.84 moles of NCO groups per kg of prepolymer formed by reaction of (i) at least partly crystalline polyester polyols which are solid at room temperature and have a degree of crystallization of at least 30% and a number average molecular weight in the range from 2000 to 10,000, optionally in admixture with liquid polyester polyols which are liquid at 20° C. and have a glass temperature below 0° C., with amorphous polyester polyols which are solid at ambient temperature and have a glass temperature above 0° C., with polyether polyols having a number average molecular weight of 500 to 10,000, or with mixtures of any two or more of said liquid polyester polyols, amorphous polyester polyols, and polyether polyols with (ii) isocyanates; having a functionality of more than 1 which are not isocyanurates and
   b) isocyanurates that are trimers of diisocyanates.

2. A moisture-curing hotmelt adhesive as claimed in claim 1, wherein the polyurethane prepolymers have a content of NCO groups of 0.22 to 0.72 moles of NCO groups per kg of prepolymer.

3. A moisture-curing hotmelt adhesive as claimed in claim 2, wherein the crystalline polyester polyols and any liquid and amorphous polyester polyols and polyether polyols have an OH functionality of 1.8 to 2.7.

4. A moisture-curing hotmelt adhesive as claimed in claim 3, wherein the number average molecular weights of the crystalline polyester polyols are in the range from 3000 to 7000, the number average molecular weights of any liquid and amorphous polyester polyols are in the range from 1500 to 5000 and the number average molecular weights of any polyether polyols are in the range from 1500 to 5000.

5. A moisture-curing hotmelt adhesive as claimed in claim 4, wherein the crystalline polyester polyols are condensation products of glycols selected from the group consisting of ethylene glycol, butylene glycol, hexamethylene glycol and decamethylene glycol and of dicarboxylic acids selected from the group consisting of oxalic acid, suberic acid, adipic acid, sebacic acid, phthalic acid, isophthalic acid, terephthalic acid and hexahydrophthalic acid; any liquid and amorphous polyester polyols that are present are condensation products of polyols from the group consisting of ethylene glycol, polyethylene glycol, propylene glycol, polypropylene glycol, butylene glycol, neopentyl glycol, hexamethylene glycol, decamethylene glycol, bisphenol A, reaction products of bisphenol A with ethylene oxide or propylene oxide, glycerol and pentaerythritol with dicarboxylic acids from the group consisting of adipic acid, maleic acid, phthalic acid and isophthalic acid; and any polyether polyols that are present are selected from the group consisting of polyethylene glycol, polypropylene glycol, polytetramethylene glycol, and copolymers of one or more of ethylene glycol, propylene glycol, and tetramethylene glycol.

6. A moisture-curing hotmelt adhesive as claimed in claim 5, wherein the crystalline polyester polyols are condensation products of hexamethylene glycol or decamethylene glycol and adipic acid and any liquid and amorphous polyester polyols that are present are condensation products of glycols selected from the group consisting of ethylene glycol, diethylene glycol and neopentyl glycol.

7. A moisture-curing hotmelt adhesive as claimed in claim 6, wherein the isocyanates having a functionality of more than 1 reacted to form component (a) are selected from the group consisting of diphenylmethane-4,4'-diisocyanate, diphenylmethane-2,4'-diisocyanate, hydrogenation products of diphenylmethane4,4'-diisocyanate and diphenylmethane-2,4'-diisocyanate, tolylene-2,4-diisocyanate, tolylene-2,6-diisocyanate, hexamethylene diisocyanate, isophorone diisocyanate and naphthylene-1,5-diisocyanate, including mixtures thereof.

8. A moisture-curing hotmelt adhesive as claimed in claim 7, wherein the isocyanurates are derived from diisocyanates selected from the group consisting of diphenylmethane-4,4'-diisocyanate, diphenylmethane-2,4'-diisocyanate, hydrogenation products of diphenylmethane-4,4'-diisocyanate and diphenylmethane-2,4'-diisocyanate, tolylene-2,4'-diisocyanate, tolylene-2,6-diisocyanate, hexamethylene diisocyanate, isophorone diisocyanate and naphthylene-1,5-diisocyanate, including mixtures thereof.

9. A moisture-curing hotmelt adhesive as claimed in claim 8, wherein the isocyanurates are trimerized isophorone diisocyanate.

10. A moisture-curing hotmelt adhesive as claimed in claim 9, wherein the polyurethane prepolymers are obtainable by reaction of:
  94 to 40% by weight of crystalline polyester polyols,
  0 to 40% by weight of polyols selected from the group consisting of liquid and amorphous polyester polyols and polyether polyols and
  6 to 20% by weight of isocyanates having a functionality of more than 1, the sum of the percentages lying within these ranges being 100% by weight.

11. A moisture-curing hotmelt adhesive as claimed in claim 10, wherein the polyurethane prepolymers are formed by reaction of:
  90 to 50% by weight of crystalline polyester polyols,
  4 to 30% by weight of liquid, amorphous, or both liquid and amorphous polyester polyols and
  6 to 20% by weight of isocyanates having a functionality of more than 1, the sum of the percentages lying within these ranges being 100% by weight.

12. A moisture-curing hotmelt adhesive as claimed in claim 11, containing:
  80 to 99.8% by weight of polyurethane prepolymers and
  20 to 0.2% by weight of isocyanurates that are trimers of diisocyanates.

13. A moisture-curing hotmelt adhesive as claimed in claim 1, wherein the crystalline polyester polyols and any liquid and amorphous polyester polyols and polyether polyols have an OH functionality of 1.8 to 2.7.

14. A moisture-curing hotmelt adhesive as claimed in claim 1, wherein the number average molecular weights of the crystalline polyester polyols are in the range from 3000 to 7000, the number average molecular weights of any liquid and amorphous polyester polyols are in the range from 1500 to 5000 and the number average molecular weights of any polyether polyols are in the range from 1500 to 5000.

15. A moisture-curing hotmelt adhesive as claimed in claim 1 wherein the crystalline polyester polyols are condensation products of glycols selected from the group consisting of ethylene glycol, butylene glycol, hexamethylene glycol and decamethylene glycol and of dicarboxylic acids selected from the group consisting of oxalic acid, suberic acid, adipic acid, sebacic acid, phthalic acid, isophthalic acid, terephthalic acid and hexahydrophthalic acid; any liquid and amorphous polyester polyols that are present are condensation products of polyols from the group consisting of ethylene glycol, polyethylene glycol, propylene glycol, polypropylene glycol, butylene glycol, neopentyl glycol, hexamethylene glycol, decamethylene glycol, bisphenol A, reaction products of bisphenol A with ethylene oxide or propylene oxide, glycerol and pentaerythritol with dicarboxylic acids from the group consisting of adipic acid, maleic acid, phthalic acid and isophthalic acid; and any polyether polyols that are present are selected from the group consisting of polyethylene glycol, polypropylene glycol, polytetramethylene glycol, and copolymers of one or more of ethylene glycol, propylene glycol, and tetramethylene glycol.

16. A moisture-curing hotmelt adhesive as claimed in claim 15, wherein the crystalline polyester polyols are condensation products of hexamethylene glycol or decamethylene glycol and adipic acid and any liquid and amorphous polyester polyols that are present are condensation products of glycols selected from the group consisting of ethylene glycol, diethylene glycol and neopentyl glycol.

17. A moisture-curing hotmelt adhesive as claimed in claim 1, wherein the isocyanurates are derived from diisocyanates selected from the group consisting of diphenylmethane4,4'-diisocyanate, diphenylmethane-2,4'-diisocyanate, hydrogenation products of diphenylmethane-4,4'-diisocyanate and diphenylmethane-2,4'-diisocyanate, tolylene-2,4'-diisocyanate, tolylene-2,6-diisocyanate, hexamethylene diisocyanate, isophorone diisocyanate and naphthylene-1,5-diisocyanate, including mixtures thereof.

18. A moisture-curing hotmelt adhesive as claimed in claim 1, wherein the isocyanurates are trimerized isophorone diisocyanate.

19. A moisture-curing hotmelt adhesive as claimed in claim 1, wherein the polyurethane prepolymers are formed by reaction of:
  94 to 40% by weight of crystalline polyester polyols,
  0 to 40% by weight of polyols selected from the group consisting of liquid and amorphous polyester polyols and polyether polyols and
  6 to 20% by weight of isocyanates having a functionality of more than 1, the sum of the percentages lying within these ranges being 100% by weight.

20. A moisture-curing hotmelt adhesive as claimed in claim 1, containing:
  80 to 99.8% by weight of polyurethane prepolymers and
  20 to 0.2% by weight of isocyanurates that are trimers of diisocyanates.

* * * * *

UNITED STATES PATENT AND TRADEMARK OFFICE
CERTIFICATE OF CORRECTION

PATENT NO.   : 6,191,212 B1
DATED        : February 20, 2001
INVENTOR(S)  : Kube It is certified that error appears in the above-identified patent and that said Letters Patent is hereby corrected as shown below:

<u>Column 7,</u>
Line 11, delete "diphenylmethane4,4'-diisocyanate" and insert therefore
-- diphenylmethane-4,4'-diisocyanate --.

<u>Column 8,</u>
Line 36, delete "diphenylmethane4,4'-diisocyanate" and insert therefore
-- diphenylmethane-4,4'-diisocyanate --.

Signed and Sealed this

Fifteenth Day of April, 2003

JAMES E. ROGAN
*Director of the United States Patent and Trademark Office*